United States Patent [19]
Fujita et al.

[11] Patent Number: 5,473,538
[45] Date of Patent: Dec. 5, 1995

[54] VEHICLE COLLISION JUDGING SYSTEM FOR CONTROLLING BRAKE ACTUATION

[75] Inventors: Yasuhiko Fujita; Toshiaki Arai; Hayato Kikuchi; Yoshikazu Tsuchiya; Makoto Sato; Kunio Nanno, all of Wako, Japan

[73] Assignee: Honda Giken Kogyo Kabushiki Kaisha, Tokyo, Japan

[21] Appl. No.: 997,969

[22] Filed: Dec. 28, 1992

[30] Foreign Application Priority Data

Dec. 27, 1991 [JP] Japan ................... 3-347493

[51] Int. Cl.⁶ ............................................. B60L 3/00
[52] U.S. Cl. ................................ 364/424.05; 342/70
[58] Field of Search .................... 342/70; 340/903, 340/904; 351/1; 364/424.01, 424.05, 424.02, 426.01, 426.04

[56] References Cited

U.S. PATENT DOCUMENTS

| | | | |
|---|---|---|---|
| 4,168,499 | 9/1979 | Matsumura et al. | 342/70 |
| 4,628,317 | 12/1986 | Nishikawa | 340/903 |
| 4,641,136 | 2/1987 | Kowalczyk | 340/904 |
| 4,833,469 | 5/1989 | David | 340/901 |
| 5,039,217 | 8/1991 | Maekawa et al. | 351/1 |
| 5,249,157 | 9/1993 | Taylor | 340/903 |
| 5,291,207 | 3/1994 | Kikuchi et al. | 342/70 |

FOREIGN PATENT DOCUMENTS

| | | |
|---|---|---|
| 3637165A1 | 5/1988 | Germany. |
| 3830790A1 | 3/1990 | Germany. |

OTHER PUBLICATIONS

Description of Relevance of the References to Invention.

*Primary Examiner*—Kevin J. Teska
*Assistant Examiner*—Dan Fiul
*Attorney, Agent, or Firm*—Armstrong, Westerman, Hattori, McLeland and Naughton

[57] ABSTRACT

A collision judging system for a vehicle comprises a subject vehicle position estimating means for estimating the position of the subject vehicle after a lapse of a preset time from a certain braking start time, on the assumption that the braking is starting at such braking start time, an obstacle position estimating means for estimating the position of an objective obstacle after the lapse of the preset time, and the judging means for judging whether or not the position of the subject vehicle estimated by the subject vehicle position estimating means and the position of the obstacle estimated by the obstacle position estimating means coincide with each other. Thus, the judgment of collision can be performed with the avoidance of the collision by the driver's operation being taken into consideration, leading to an improved feeling of driving operation.

5 Claims, 6 Drawing Sheets

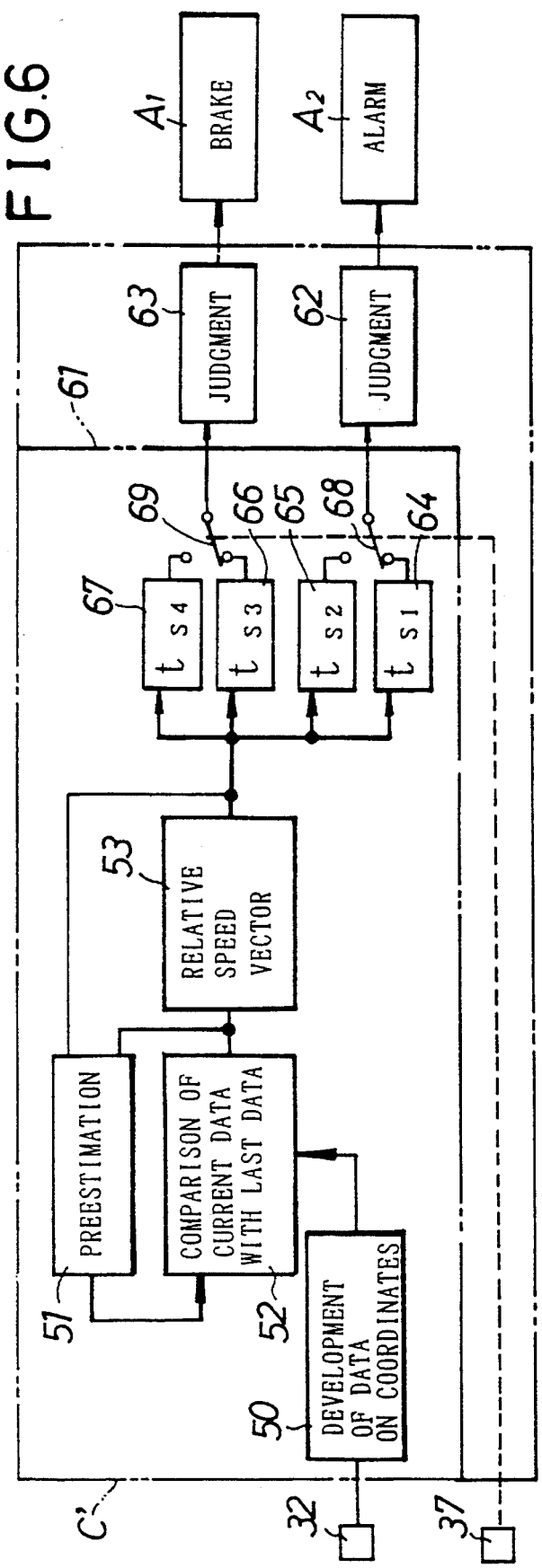

VEHICLE COLLISION JUDGING SYSTEM FOR CONTROLLING BRAKE ACTUATION

BACKGROUND OF THE INVENTION

1. Field of the Invention

The present invention relates to a collision judging system for a vehicle.

2. Description of the Prior Art

A collision preventing system is conventionally known as disclosed, e.g., in Japanese Patent Publication No. 4700/86, in which a distance between the subject vehicle and an objective obstacle is measured, while at the same time, a slip distance for braking at a current travel speed of the subject vehicle, is calculated, and both the distances are compared with each other, whereby a brake device is operated on the basis of the result of comparison.

However, the calculated slip distance for braking is relatively long, even on a travel road surface having a large friction coefficient. Therefore, the brake device is operated, even if there is enough distance for avoiding the collision by steering operation, resulting in a high frequency of operation of the brake device, which is not preferred for the driver's feeling of driving operation. If a variation in friction coefficient of the travel road surface is taken into consideration, the timing of starting the braking operation becomes early, resulting in a further significantly increased frequency of operation of the brake device and in a further significantly deteriorated feeling of driving operation.

SUMMARY OF THE INVENTION

Accordingly, it is an object of the present invention to provide a collision judging system for a vehicle, wherein the frequency of operation of the actuator can be reduced, and the feeling of driver operation can be improved.

To achieve the above object, according to the first embodiment of the present invention, there is provided a collision judging system for a vehicle, comprising a subject vehicle position estimating means for estimating the position of the subject vehicle after a lapse of a preset time from a certain braking start time, on the assumption that the braking is started at such braking start time; an obstacle position estimating means for estimating the position of an objective obstacle after the lapse of the preset time; and a judging means for judging whether or not the position of the subject vehicle, estimated by the subject vehicle position estimating means, and the position of the obstacle, estimated by the obstacle position estimating means, coincide with each other.

With such construction, it is possible to perform the judgment of a collision with the avoidance of collision by the driver's operation being taken into consideration, thereby providing an improvement in feeling of driving operation.

According to a second embodiment of the present invention, the subject vehicle position estimating means further estimates the position of the subject vehicle, after the lapse of the preset time, by multiplying a vector of the subject vehicle based on the travel speed and direction of the subject vehicle by the preset time, and the obstacle position estimating means estimates the position of the objective obstacle after the lapse of the preset time by finding a relative speed vector of the objective obstacle based on a change in relative position of the objective obstacle relating to the subject vehicle and by multiplying, by the preset time, an absolute speed vector of the objective obstacle obtained by adding the vector of the subject vehicle to the relative speed vector. Therefore, it can be judged whether the obstacle is a moving obstacle or a stationary obstacle, enabling an application to a more minute control.

According to a third embodiment, in addition to the second embodiment, the position of the subject vehicle, after the lapse of the preset time, is estimated in the subject vehicle position estimating means according to the following expression:

$$\{V_1 \cdot t_o + V_1 \cdot (t_s - t_o) - 0.5 \cdot \alpha_1 \cdot (t_s - t_o)^2\}$$

and the position of the objective obstacle after the lapse of the preset time is estimated in the obstacle position estimating means according to the following expression:

$$\{V_2 \cdot t_s - 0.5 \, \alpha_2 \cdot t_s^2\}$$

wherein $V_1$ represents the travel speed of the subject vehicle; $V_2$ represents the absolute speed of the objective obstacle; $t_o$ represents the calculating time; $t_s$ represents the preset time; $\alpha_1$ represents the deceleration or preset deceleration of the subject vehicle; and $\alpha_2$ represents the deceleration or preset deceleration of the objective obstacle. This enables a higher accuracy estimation of position and a higher accuracy judgment of collision, with decelerations of the subject vehicle and the objective obstacle taken into consideration.

According to a fourth embodiment of the present invention, there is provided a collision judging system for a vehicle, comprising a relative-position estimating means for estimating the position of an object obstacle, relative to the subject vehicle, after a lapse of a preset time from a certain braking start time, on the assumption that the braking is started at such braking start time, and a judging means for judging whether or not the relative position estimated by the relative-position estimating means coincides with the position of the subject vehicle.

With such construction, it is possible to perform the judgment of collision with the avoidance of collision by the driver's operation being taken into consideration, thereby providing an improvement in feeling of driving operation.

According to the fifth embodiment of the present invention, in addition to the fourth embodiment, the relative-position estimating means estimates the relative position of the obstacle position, after the lapse of the preset time, by finding a relative speed vector based on a change in relative position of the objective obstacle with respect to the subject vehicle and by multiplying the relative speed vector by the preset time. Therefore, it is possible to provide a simplified construction for judgment of collision.

According to the sixth embodiment of the present invention in addition to the fifth embodiment, the relative position, after the lapse of the preset time, is estimated in the relative-position estimating means according to the following expression:

$$[\Delta V \cdot t_s - 0.5 \cdot \{\alpha_1 \cdot (t_s - t_o)^2 - \alpha_2 \cdot t_s^2\}]$$

wherein $\Delta V$ represents the relative speed of the object obstacle with respect to the subject vehicle; $t_o$ represents the calculating time; $t_s$ represents the preset time; $\alpha_1$ represents the deceleration, or preset deceleration, of the subject vehicle; and $\alpha_2$ represents the deceleration or preset deceleration of the objective obstacle. This enables a higher accuracy estimation of position and a higher accuracy judgment of collision, with decelerations of the subject vehicle and the objective obstacle taken into consideration.

Further, according to a seventh embodiment of the present invention in addition to the first or fourth embodiments, the preset time is set shorter than the time required for avoiding a collision of the subject vehicle against the objective obstacle by the driver's operation, and the judging means is connected to an actuator for operation a brake device.

With such construction, it can be judged that the avoidance of the collision of the subject vehicle against the objective obstacle is impossible, thereby operating the actuator. Therefore, it is possible to provide a reduction in damage upon the collision without deterioration in feeling of driving operation.

The above and other objects, features and advantages of the invention will become apparent from the following description of preferred embodiments, taken in conjunction with the accompanying drawings.

BRIEF DESCRIPTION OF THE DRAWINGS

FIGS. 1 to 5 illustrate a first embodiment of the present invention, wherein

FIG. 1 is a diagrammatic illustration of the arrangement of the vehicle equipment for practicing the method of the first embodiment of the present invention;

FIG. 2 is a longitudinal sectional side view of an electric-powered hydraulic pressure producing means for use in such method;

FIG. 3 is a block diagram illustrating an arrangement of an essential portion of an electronic control unit in practicing the invention of the first embodiment;

FIG. 4 is a diagram of development of detection data of objective obstacles on coordinates of the method of the first embodiment;

FIG. 5 is a diagram of development of estimated positions of objective obstacles on coordinates in the practice of such method; and FIG. 6 is a block diagram, similar to FIG. 3, but illustrating a second embodiment of the present invention.

DESCRIPTION OF THE PREFERRED EMBODIMENTS

A first embodiment of the present invention will now be described in connection with FIGS. 1 to 5.

Figure 1:
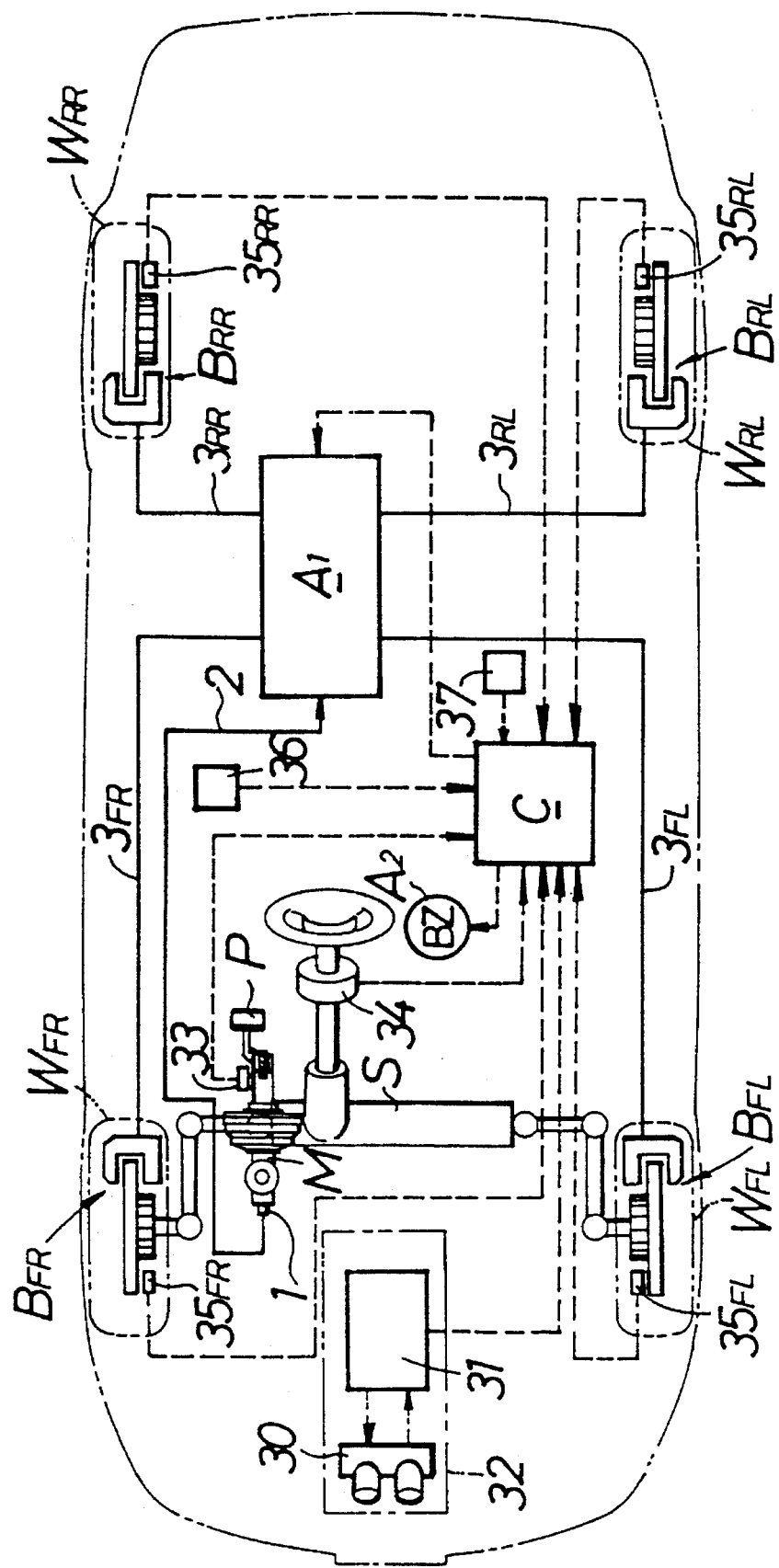

Referring first to FIG. 1, in an automobile vehicle V, a left from wheel disk brake $B_{FL}$ and a right front wheel disk brake $B_{FR}$ are mounted on a left front wheel $W_{FL}$ and a right front wheel $W_{FR}$ connected to a steering device S. A left rear wheel disk brake $B_{RL}$ and a right rear wheel disk brake $B_{RR}$ are mounted on a left rear wheel $W_{RL}$ and a right rear wheel $W_{RR}$, respectively.

An oil passage 2 is connected to an output port 1 of master cylinder M for delivering hydraulic braking pressure, corresponding to depressing operation of brake pedal P. An electric-powered hydraulic pressure producing means $A_1$, as an actuator, is interposed between the oil passage 2 and oil passages $3_{FL}$, $3_{FR}$, $3_{RL}$ and $3_{RR}$, independently connected to the disk brakes $B_{FL}$, $B_{FR}$, $B_{RL}$ and $B_{RR}$, respectively. The electric-powered hydraulic pressure producing means $A_1$ is shiftable between an inoperative state, in which the passage 2 and each of the oil passages $3_{FL}$, $3_{FR}$, $3_{RL}$ and $3_{RR}$ are put in communication with each other, for permitting hydraulic braking pressure from master cylinder M to be applied to each of the disk brakes $B_{FL}$, $B_{FR}$, $B_{RL}$ and $B_{RR}$, and an operative state in which communication between the oil passage 2 and each of the oil passages $3_{FL}$, $3_{FR}$, $3_{RL}$ and $3_{RR}$ is cut off, and hydraulic pressure produced by electric-powered hydraulic pressure producing means $A_1$ is applied to each of the disk brakes $B_{FL}$, $B_{FR}$, $B_{RL}$ and $B_{RR}$.

Figure 2:
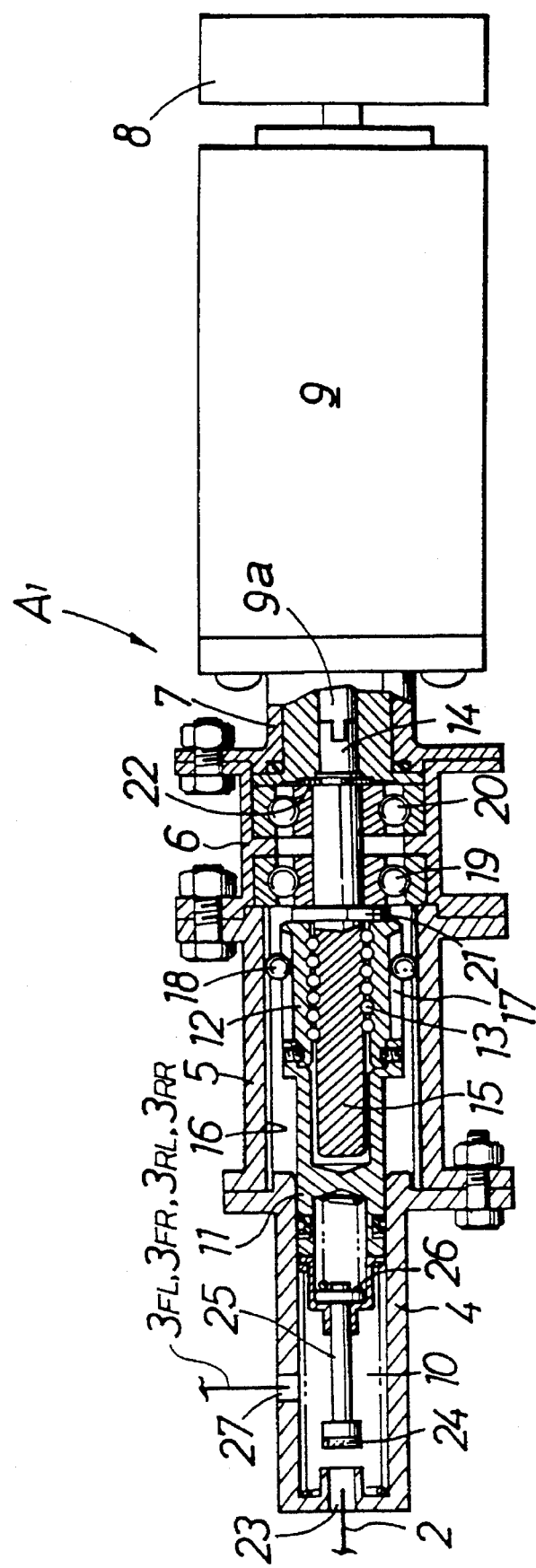

Referring to FIG. 2, the electric-powered hydraulic pressure producing means $A_1$ comprises a cylinder 4, formed into a bottomed cylindrical shape, with its tip end closed. A cylinder guide 5 is coaxially connected to a rear end of the cylinder 4. A cylindrical support 6 is coaxially connected to the cylindrical guide 5. A cylindrical connecting to member 7 is coaxially connected the cylindrical support 6. A motor 9, having an encoder 8, is coaxially connected to the cylindrical connecting member 7. A piston 11 is slidably received in cylinder 4 to define pressure chamber 10 between piston 11, itself, and the closed end of the cylinder 4. A cylindrical nut member 12 is disposed within the cylindrical guide 5 for inhibited rotation about an axis of the nut member 12, and is coaxially connected to a rear end of the piston 11. A rotary shaft 15 is coupled to the nut member 12, through a ball screw 13, and connected to an output shaft 9a of the motor 9 through an Oldham's joint 14.

A plurality of axially extending grooves 16 and 17 are provided in an inner surface of cylindrical guide 5 and an outer surface of the nut member 12 in alignment with each other. A ball 18 is received in each of aligned grooves 16 and 17, thereby inhibiting the rotation of the nut member 12 and, thus, piston 11, about an axis thereof. The rotary shaft 15 is rotatably carried in the cylindrical support 6 with a pair of ball bearings 19 and 20 interposed therebetween. A collar 21 is provided on the rotary shaft 15 and extends radially outwardly. A retaining ring 22 is mounted around the rotary shaft 15. Axial movement of rotary shaft 15 is inhibited by engagement of the collar 21 and the retaining ring 22 with axially outer ends of inner peripheries of the ball bearings 19 and 20, respectively.

The cylinder 4 is provided at its forward end with a valve bore 23 leading to oil passage 2 connected to master cylinder M. A valve member 24, for opening such closing valve bore 23 is retained on piston 11. More specifically, a rod 25 is retained at its rear end on the front end of the piston 11 for axial movement in a predetermined range. Valve member 24 is mounted on the front end of the rod 25. A spring 26 is compressed between the rod 25 and the piston 11 for biasing the rod 25 and, thus, the valve member 24 toward the valve bore 23.

Cylinder 4 is provided with an output port 27 which leads to the pressure chamber 10. The oil passages $3_{FL}$, $3_{FR}$, $3_{RL}$ and $3_{RR}$, independently leading to the disk brakes $B_{FL}$, $B_{FR}$, $B_{RL}$ and $B_{RR}$, are connected to the output port 27.

In electric-powered hydraulic pressure producing means $A_1$, the piston 11 is reciprocally axially-moved by the ball screw 13, in response to forward and reverse rotation of the motor 9. When the piston 11 is moved forwardly, the valve bore 23 is closed by the valve member 24, and hydraulic pressure, corresponding to the amount of piston 11 movement, is generated in the pressure chamber 10 and applied to each of the disk brakes $B_{FL}$, $B_{FR}$, $B_{RL}$ and $B_{RR}$.

Referring again to FIG. 1, distance measuring unit 32 is mounted at a front portion of the automobile vehicle. The distance measuring unit 32 comprises a transmitting and receiving section 30 capable, respectively, of transmitting a signal forwardly from the vehicle and receiving a reflected signal from an objective obstacle, and a calculating section 31 for calculating distance between the subject vehicle and the objective obstacle on the basis of the time for transmitting of the signal from the transmittion back to the reception.

The distance measuring unit 32 is capable of scanning in a widthwise direction of the vehicle to detect the distance from the subject vehicle to the objective obstacle in a given range in the widthwise direction of such vehicle.

The brake pedal P is provided with a depression force sensor 33, and the steering device S is provided with a steering angle sensor 34. Wheel speed sensors $35_{FL}$, $35_{FR}$, $35_{RL}$ and $35_{RR}$ are mounted to the wheels for independently detecting each wheel speed, respectively. Signals from the sensors 33, 34, $35_{FL}$, $35_{FR}$, $35_{RL}$ and $35_{RR}$, and the distance measuring unit 32, are supplied into an electronic control unit C. Further, signals from a yaw rate sensor 36 for detecting a yaw rate of the vehicle and from a vigilance degree detector 37 are also supplied into the electronic control unit C. As the vigilance degree detector 37, which may be used, these are listed ones for analyzing frequency components for driver's driving operations (e.g., an operation of an accelerator and a steering operation), for analyzing the conditions of motion of the vehicle (e.g., whether or not each of the longitudinal acceleration and lateral acceleration exceeds a preset value, or the like), for monitoring the movements of driver's eyeballs and eyelids, and for metering physiological phenomenons such as the driver's brain wave, pulsation and skin resistance. When the vigilance degree is reduced to a level less than a predetermined value, a high level signal is delivered from the vigilance degree detector 37.

The electronic control unit C controls the operation of the electric-powered hydraulic pressure producing means $A_1$ on the basis of the signals from the distance measuring unit 32, the wheel speed sensors $35_{FL}$, $35_{FR}$, $35_{RL}$ and $35_{RR}$, the yaw rate sensor 36 and the vigilance degree detector 37, and controls an alarm $A_2$ as an actuator.

Figure 3:
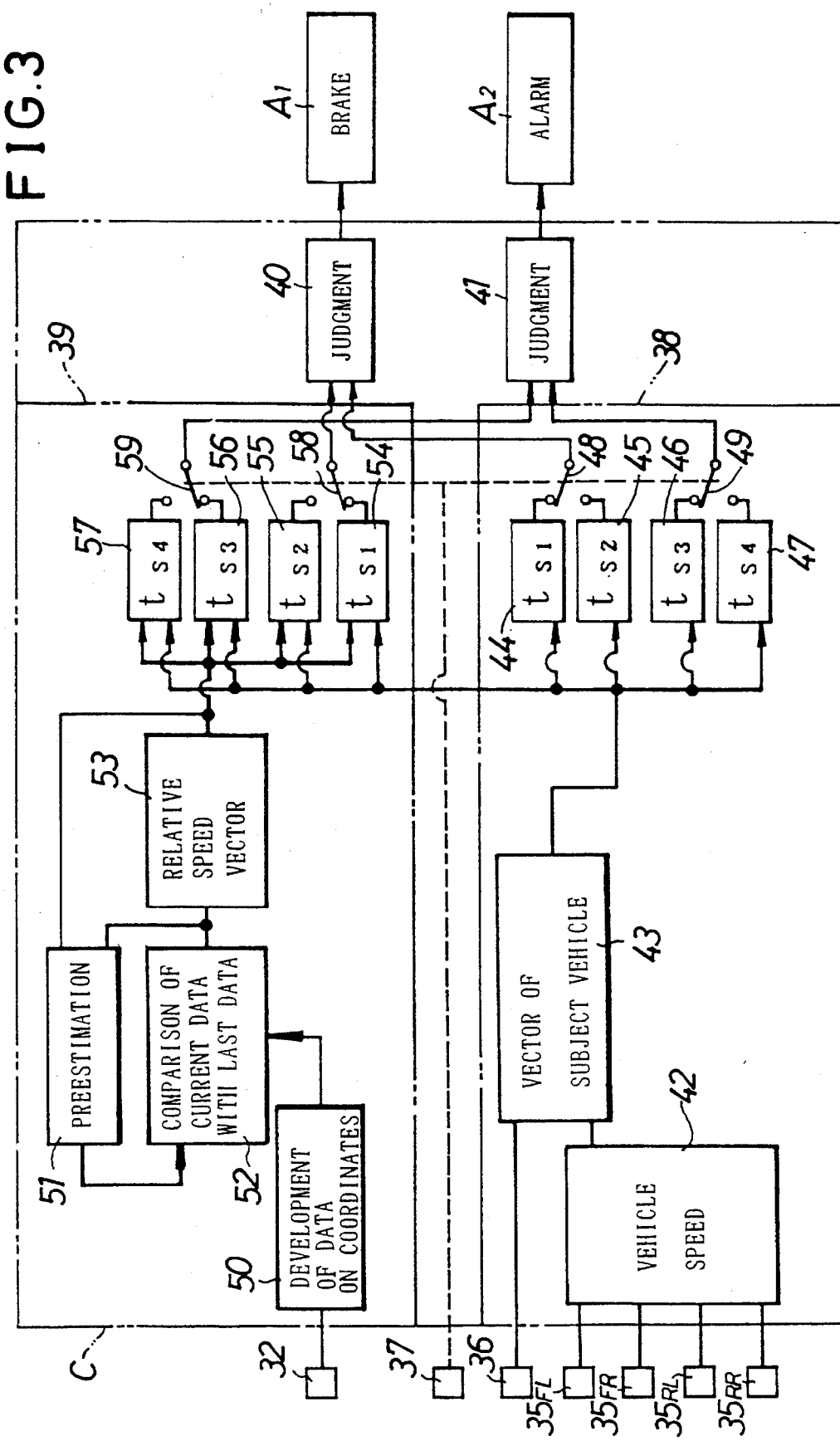

Referring to FIG. 3, the electronic control unit C comprises a subject vehicle position estimating means 38, an obstacle position estimating means 39, and first and second judging means 40 and 41.

The subject vehicle position estimating means 38 comprises a vehicle speed calculating section 42 for calculating a vehicle speed on the basis of detection values detected by the wheel speed sensors $35_{FL}$, $35_{FR}$, $35_{RL}$ and $35_{RR}$; a subject vehicle vector calculating section 43 for determining a vector of the subject vehicle on the basis of a yaw rate detected by the yaw rate sensor 36 and by a vehicle speed obtained in the vehicle speed calculating section 42; first, second, third and fourth subject vehicle positions calculating section 44, 45, 46 and 47; a switchover section 48 for selecting either one of outputs from the first and second subject vehicle position calculating sections 44 and 45, in accordance with an output signal from the vigilance degree detector 37, to supply such selected output to the first judging means 40; and a switchover section 49 for selecting either one of outputs from the third and fourth subject vehicle position calculating sections 46 and 47, in accordance with the output signal from the vigilance degree detector 37, to supply such selected output to the second judging means 41.

In each of the first, second, third and fourth subject vehicle position calculating sections 44, 45, 46 and 47, supposing that the braking is started at a certain time, the subject vehicle vector, based on the travel speed and direction of the subject vehicle, is multiplied by a preset time, thereby calculating the position of the subject vehicle after a lapse of the preset time from the braking starting time. More specifically, if the travel speed of the subject vehicle is represented by $V_1$ and the calculation time required from the detection to the delivery is by $t_o$, and if the preset time is represented by $t_s$, and the preset deceleration during braking is represented by $\alpha_1$, a travel distance $L_1$ of the subject vehicle, in a travelling direction for a period of time from the braking starting time until the preset time is lapsed, is determined basically according to the following expressions (1) and (2) in the first to fourth subject vehicle position calculating sections 44 to 47:

$$\Delta t = t_s - t_o \quad (1)$$

$$L_1 = V_1 \cdot t_o + V_1 \cdot \Delta t - 0.5 \cdot \alpha_1 \cdot \Delta t^2 \quad (2)$$

Here, a first preset time $t_{s1}$, e.g., 1.5 sec. shorter than the time enough to avoid the collision of the subject vehicle against an objective obstacle ahead of the vehicle by the steering or braking operation in a condition of the driver having a high vigilance degree, is set in the first subject vehicle position calculating section 44. A second preset time $t_{s2}$, e.g., 1.8 sec longer than the first preset time $t_{s1}$ is set in the second subject vehicle position calculating section 45. A third preset time $t_{s3}$, e.g. 2.5 sec longer than the second preset time $t_{s1}$ is set in the third subject vehicle position calculating section 46. A fourth preset time $t_{s4}$, e.g., 2.8 sec longer than the third preset time $t_{s3}$ is set in the fourth subject vehicle position calculating section 47. Thus, in each of the subject vehicle position calculating sections 44 to 47, the calculations, according to the above-described expressions, are carried out on the basis of each of the preset times $t_{s1}$ to $t_{s4}$, independently set therein, thereby estimating the position of the subject vehicle after a lapse of each of the preset times $t_{s1}$ to $t_{s4}$ from the braking starting time point.

The switchover section 48 is adapted to supply the output from the first subject vehicle position calculating section 44 into the judging means 40, when the output from the vigilance degree detector 37 is of a low level, i.e., when the vigilance degree of the driver is sufficiently high, and to supply the output from the second subject vehicle position calculating section 45 into the judging means 40, when the output from the vigilance degree of detector 37 becomes a low level, i.e., when the vigilance degree of the driver is decreased. The switchover section 49 is adapted to supply the output from the third subject vehicle position calculating section 46 into the judging means 41, when the output from the vigilance degree detector 37 is of a low level, and to supply the output from the fourth subject vehicle position calculating section 47 into the judging means 41, when the output from the vigilance degree detector 37 becomes a high level.

The obstacle position estimating means 39 comprises a coordinates developing section 50 for developing positions of objective obstacles on X and Y coordinates by the signal from the distance measuring unit 32; a preestimating and calculating section 51; a comparing and calculating section 52 for comparing data preestimated in the immediately preceding time in the preestimating and calculating section 51 with current data developed on the coordinates developing section 50 to take up the data decided as the same obstacle; a relative speed vector calculating section 53 for calculating a relative speed vector of objective obstacles on the basis of the data decided as the same obstacle; first, second, third and fourth obstacle position calculating sections 54, 55, 56 and 57; a switchover section 58 for selecting either one of outputs from the first and second obstacle position calculating section 54 and 55, in accordance with the output signal from the vigilance degree detector 37, for supplying such selected output into the first judging means 40; and a switchover section 59 for selecting either one of outputs from the third and fourth obstacle position calculating sections 56 and 56, in accordance with the output signal from the vigilance degree detector 37, for supplying such selected output second judging means 41.

Figure 4:
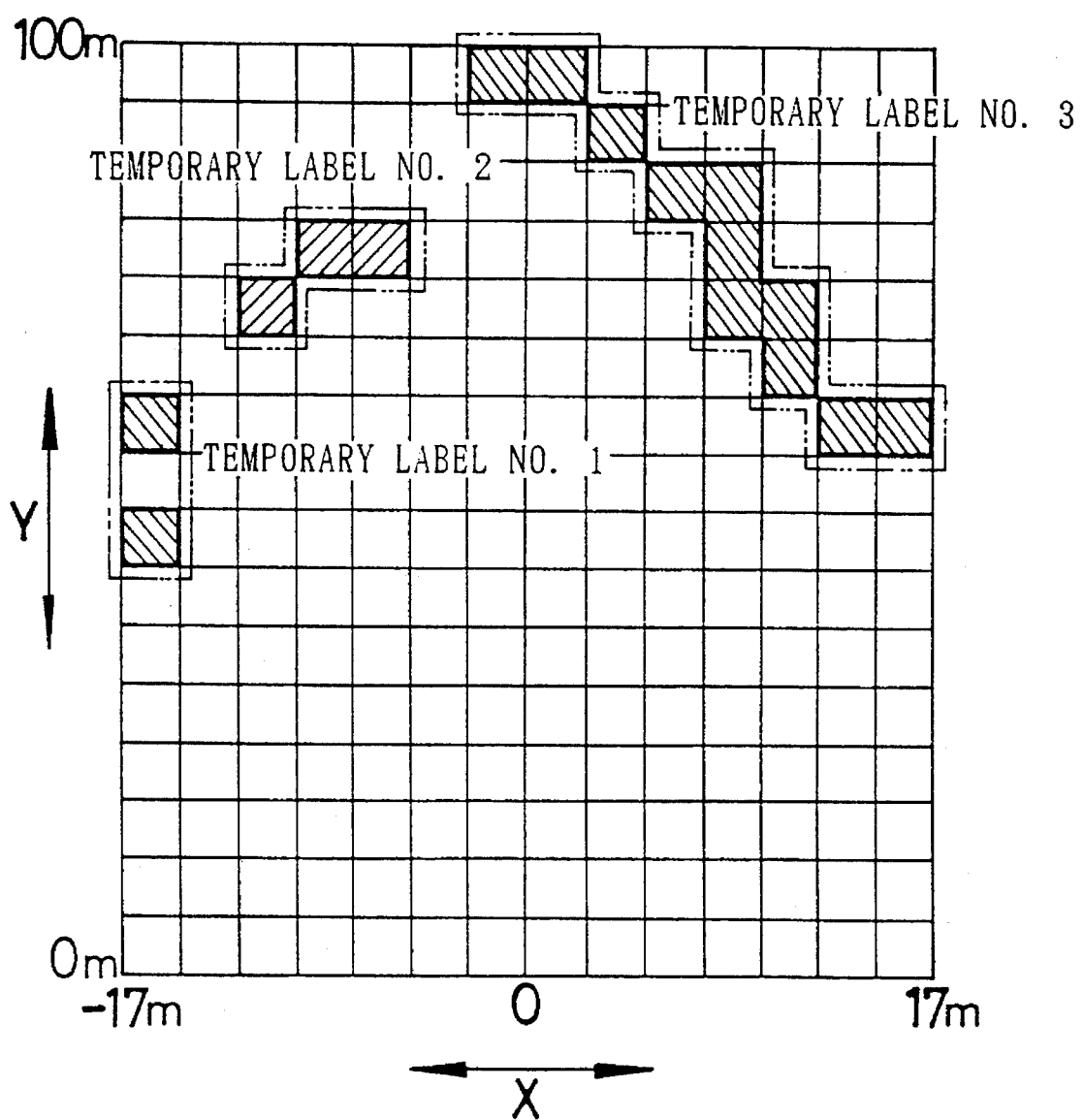

In the coordinates developing section 50, the data from the distance measuring unit 32 are developed on the X and Y coordinates in which the position of the subject vehicle is defined as an origin (X=0 and Y=0); the widthwise direction of the vehicle is represented by an X axis and the travel direction of the vehicle is represented by a Y axis, and-temporary labels are sequentially affixed; for example, as Nos. 1, 2, 3 - - - , to the obstacle data which are in proximity to one another on the coordinates, as shown in FIG. 4. For example, the temporary labels Nos. 1, 2 and 3 are affixed in FIG. 4, and the coordinates of the width (the length in a direction of the X axis), the longitudinal length (the length in a direction of the Y axis) as well as the position of the center of gravity for every temporary labels Nos. 1, 2 and 3 are found, as given in Table 1.

TABLE 1

| | Detection Data | | | |
|---|---|---|---|---|
| Temporary | Width | Longitudinal length | Position of gravity center | |
| label No. | (m) | (m) | X abscissa | Y ordinate |
| 1 | 2.4 | 18.8 | −15.8 | +53.1 |
| 2 | 7.3 | 12.5 | −8.5 | +76.9 |
| 3 | 19.4 | 43.8 | +8.5 | +78.1 |

The preestimating and calculating section 51 calculates the preestimated position for every formal label on the basis of the data formally labeled in the comparing/calculating section 52 as well as the relative speed vector provided in the relative speed vector calculating section 53, thereby preestimating the width (the length in the direction of X axis), the longitudinal length (the length in the direction of Y axis), as well as the position of gravity center for every formal label, for example, as given in Table 2.

TABLE 2

| | Last Preestimated Data | | | |
|---|---|---|---|---|
| | Width | Longitudinal length | Position of gravity center | |
| Label No. | (m) | (m) | X abscissa | Y ordinate |
| 4 | 7.3 | 15.6 | −9.0 | +76.0 |
| 8 | 2.4 | 21.2 | −15.8 | +54.0 |
| 15 | 17.0 | 50.0 | +9.7 | +70.6 |

In the comparing/calculating section 52, the current (now) data given in Table 1 is compared with the preestimated data given in Table 2, and only the current data, having the position of gravity center substantially corresponding to the position of gravity center of the preestimated data, is affixed with a formal label, as given in Table 3, and delivered from the comparing/calculating section 52.

TABLE 3

| | | | Current Data | | |
|---|---|---|---|---|---|
| | | | | Position of gravity center | |
| | | | Longitudinal | | |
| Label No. | La. | Width | length | X | |
| label▶ | No. | (m) | (m) | abscissa | Y ordinate |
| 2▶ | 4 | 7.3 | 12.5 | −8.5 | +76.9 |
| 1▶ | 8 | 2.4 | 18.8 | −15.8 | +53.1 |
| 3▶ | 15 | 19.4 | 43.8 | +8.5 | +78.1 |

Tem. La. = Temporary Label
La. = Label

In the relative speed vector calculating section 53, the relative speed vector for every formal label is calculated on the basis of the current data delivered from the comparing/calculating section 52 and the last data delivered last time from the comparing/calculating section 52. Thus, when the last data from the comparing/calculating section 52 is as given in Table 4, the position of gravity center of the current data given in Table 3, is compared with the position of gravity center of the last data given in Table 4, thereby calculating a difference between the positions of gravity centers in the directions of X and Y axes for every formal label, as given in Table 5.

TABLE 4

| | Last Data | | | |
|---|---|---|---|---|
| | Width | Longitudinal length | Position of gravity center | |
| Label No. | (m) | (m) | X abscissa | Y ordinate |
| 4 | 7.0 | 12.0 | −9.7 | +74.9 |
| 8 | 2.4 | 18.6 | −16.8 | +52.7 |
| 15 | 18.6 | 40.4 | +8.5 | +82.2 |

TABLE 5

| | Relative Difference | |
|---|---|---|
| Label No. | Relative Value | |
| No. | X | Y |
| 4 | +1.2 | +2.0 |
| 8 | +1.0 | +0.4 |
| 15 | 0.0 | −4.1 |

The relative speed of each objective obstacle, relative to the subject vehicle, is obtained by dividing the difference for every formal label given in Table 5 by a sampling time, and the moving direction is provided from the relative difference between the directions of X and Y axes, given in Table 5.

In each of the first, second, third and fourth obstacle position calculating sections 54, 55, 56 and 57, supposing that the braking is started at a certain time, the position of the objective obstacle, after a lapse of the preset time from the braking starting time, is calculated by multiplying, by the preset time, the relative speed vector of the objective obstacle, obtained by adding the vector of the subject vehicle, provided in the subject vehicle vector calculating section 43 of the subject vehicle position calculating means 38, to the relative speed vector provided in the relative speed vector calculating section 53. More specifically, if the absolute speed of the objective obstacle, resulting from the addition of the relative speed to the speed of the subject vehicle, is represented by $V_2$ and the preset time is by $t_s$, and if the preset deceleration of the objective obstacle is by $\alpha_2$, the movement distance $L_2$, in the direction of movement of the objective obstacle after a lapse of the preset time, is determined basically according to the following expression (3) in each of the first, second, third and fourth obstacle position calculating sections 54, 55, 56 and 57:

$$L_2 = V_2 \cdot t_s - 0.5 \cdot x_2 \cdot \Delta t_s^2 \qquad (3)$$

Figure 5:
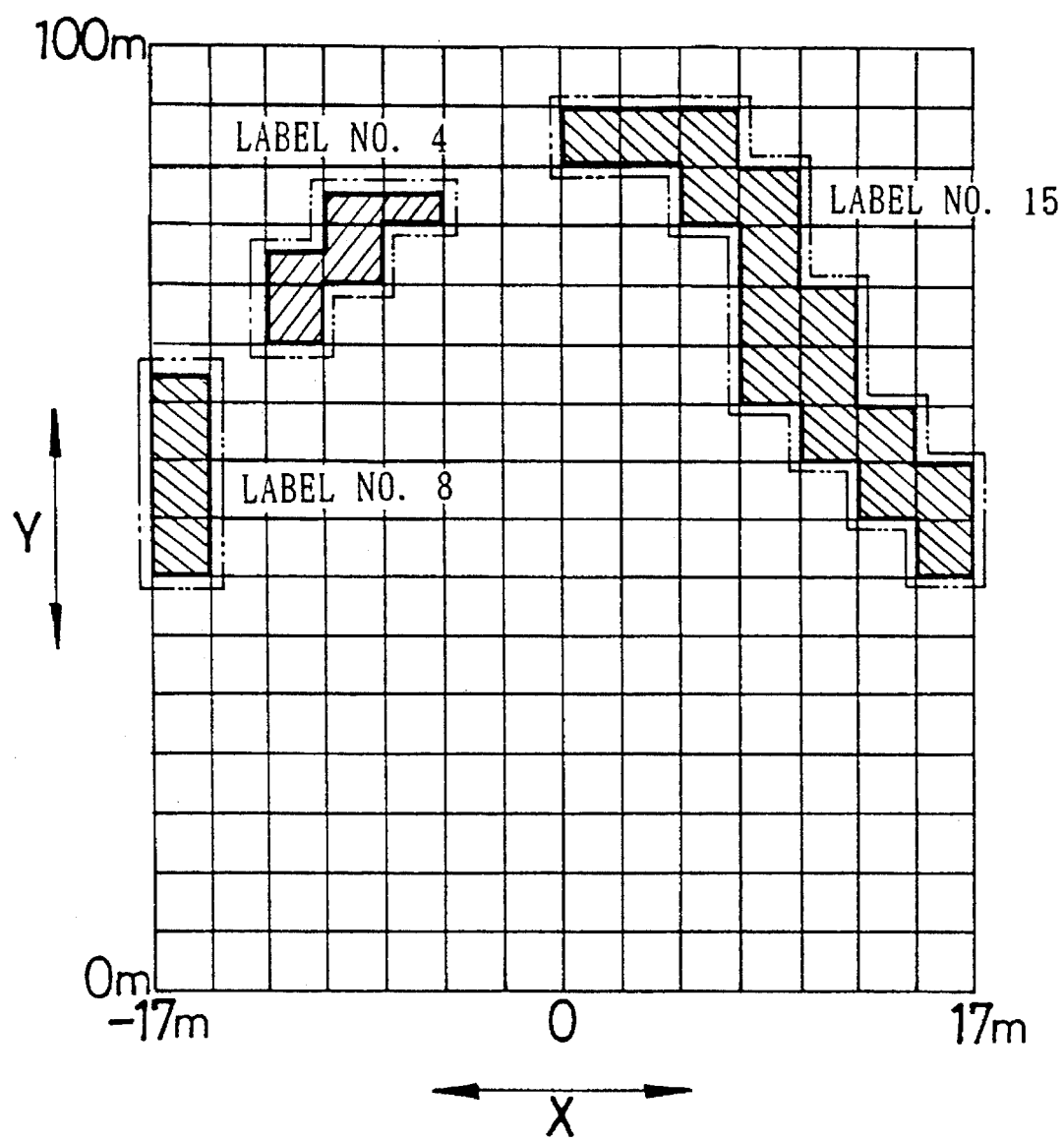

Here, a first preset time $t_{s1}$ is set in the first obstacle position calculating section 54; a second preset time $t_{s2}$ is set in the second obstacle position calculating section 55; a third preset time $t_{s3}$ is set in the third obstacle position calculating section 56, and a fourth preset time $t_{s4}$ is set in the fourth obstacle position calculating section 57. In each of the first, second, third and fourth obstacle position calculating sections 54, 55, 56 and 57, the calculation, according the above expression (3), is carried out by use of each of the preset times $t_{s1}$ to $t_{s4}$, independently set therein. This allows the position of the objective obstacle, after the lapse of each of the preset times $t_{s1}$, $t_{s2}$, $t_{s3}$ and $t_{s4}$, to be estimated, thereby enabling the estimated position of the objective obstacle, after the lapse of each of the preset times $t_{s1}$, $t_{s2}$, $t_{s3}$ and $t_{s4}$, to be developed on the X and Y coordinates, as shown in FIG. 5.

The switchover section 58 is set to supply the output from the first obstacle position calculating section 54 into the judging means 40, when the output from the vigilance degree detector 37 is of the low level, and to supply the output from the second obstacle position calculating section 55 into the judging means 40, when the output from the vigilance degree detector 37 is of the high level. The switchover section 59 is set to supply the output from the third obstacle position calculating section 56 into the judging means 41, when the output from the vigilance degree detector 37 is of the low level, and to supply the output from the fourth obstacle position calculating section 57 into the judging means 41, when the output from the vigilance degree detector 37 is at the high level.

The judging means 40 compares the position of the subject vehicle, delivered from the first or second subject vehicle position calculating section 44 or 45 of the subject vehicle position estimating means 38 with the position of the objective obstacle, delivered from the first or second obstacle position calculating section 54 or 55 of the obstacle position estimating means 39, and produces an operating signal, indicative of a command to operate the electric-powered hydraulic pressure producing means $A_1$, when these positions coincide with each other. More specifically, when the estimated position of the objective obstacle is superposed on the estimated position of the subject vehicle shown in FIG. 5, the electric-powered hydraulic pressure producing means $A_1$ is operated. The judging means 41 compares the position of the subject vehicle, delivered from the third or fourth subject vehicle position calculating section 46 or 47, of the subject vehicle position estimating means 38, with the position of the objective obstacle delivered from the third or fourth obstacle position calculating section 56 or 57 of the obstacle position estimating means 39, and produces an operating signal, indicative of a command to operate the alarm $A_2$, if these positions coincide with each other.

The operation of this embodiment will be described below. Supposing that the braking is started at a certain time, the position of the subject vehicle after the lapse of the preset time, from such braking start time, is estimated by the subject vehicle position estimating means 38. The position of the objective obstacle, after the lapse of the preset time from such braking start time point, is estimated by the obstacle position estimating means 39. The alarm $A_2$ can be operated for alarming, or both of the alarm $A_2$ and the electric-powered hydraulic pressure producing means $A_1$ can be operated by the comparison of both the estimated positions, thereby avoiding the collision of the vehicle against the objective obstacle, or providing a reduction in damage upon the collision.

More specifically, in a condition of the driver having a high vigilance degree, the first preset time $t_{s1}$ is set shorter than the time enough to avoid the collision of the vehicle against the objective obstacle by the driver's steering operation, and the third preset time $t_{s3}$ is set longer than the first preset time $t_{s1}$. When the positions of the subject vehicle and the objective obstacle, estimated by the calculations based on the third preset time $t_{s3}$ coincide with each other, the alarm $A_2$ can be operated to previously notify the driver of the fact that there is a possibility of collision. When the positions of the subject vehicle and the objective obstacle estimated by the calculations based on the first preset time $t_{s1}$ coincide with each other, the alarm $A_2$ can be operated and at the same time, the electric-powered hydraulic pressure producing means $A_1$ can be automatically operated, thereby avoiding the collision the vehicle against the objective obstacle, or providing a reduction in damage upon the collision.

Therefore, when the collision can be avoided by the driver's steering operation, the electric-powered hydraulic pressure producing means $A_1$ cannot be operated, leading to a reduced frequency of operation of the electric-powered hydraulic pressure producing means $A_1$ and to an improved feeling of operation.

In estimating the position of the objective obstacle, in the obstacle position estimating means 39, the absolute vector of the objective obstacle is provided. This enables a judgment of whether the objective obstacle is a moving obstacle or a stationary obstacle. Such a judgment enables an application to a more precise control.

Moreover, as can be seen in the expressions (1) and (3), the preset deceleration $\alpha_1$ is used in estimating the position of the subject vehicle, and the preset deceleration $\alpha_2$ is used in estimating the position of the objective obstacle. By estimating the positions by use of such decelerations $\alpha_1$ and $\alpha_2$, a high accuracy estimation can be achieved, and thus, a high accuracy judgment of collision can be achieved.

In the condition of the driver having a low vigilance degree, the fourth preset time $t_{s4}$ is set longer than the third preset time $t_{s3}$, and when the positions of the subject vehicle and the objective obstacle, estimated by the calculations based on the fourth preset time $t_{s4}$, coincide with each other, the alarm $A_2$ is operated. When the positions of the subject vehicle and the objective obstacle, estimated by the calculations based on the second preset time $t_{s2}$ longer than the first preset time $t_{s1}$, coincide with each other, the alarm $A_2$ is operated and, at the same time, the electric-powered hydraulic pressure producing means $A_1$ is automatically operated. That is, in the condition of the driver having a low vigilance degree, the control of the operations of the electric-powered hydraulic pressure producing means $A_1$ and the alarm $A_2$, in consideration with the vigilance degree of the driver, can be achieved by insuring a longer time required for avoiding the collision by the operations of the electric-powered hydraulic pressure producing means $A_1$ and the alarm $A_2$ for the avoidance of the collision.

Further, in the obstacle position estimating means 39, the development of the determined data on the X and Y coordinates, as well as the labeling on the coordinates, is carried out and therefore, the number and distribution of objective obstacles can be correctly grasped, and the calculation of the relative speed for every label leads to an improved accuracy of estimation of the positions of the plurality of obstacles. Moreover, the amount of movement for every label is derived from a difference between the positions of gravity centers and the labels and, therefore, the calculation of the amount of movement of the objective obstacle is simplified and correct. By calculating the relative speed vector for only the substantially corresponding data by comparing the positions of gravity centers of the last preestimated data and the current data, it is possible to ensure that a sudden variation in determined data, due to a noise, or the like, is insensitive, thereby avoiding a misjudgment.

FIG. 6 illustrate a second embodiment of the present invention, in which parts or components corresponding to those in the previously-described first embodiment are designated by the like reference characters.

An electronic control unit C' comprises a relative position estimating means 61, and first and second judging means 62 and 63. The electronic control unit C' controls the operation of the electric-powered hydraulic pressure producing means $A_1$ on the basis of signals from the distance measuring unit 32 and the vigilance degree detector 37, and also controls the operation of the alarm $A_2$.

The relative position estimating means 61 comprises a coordinates developing section 50 for developing positions of objective obstacles on the X and Y coordinates by a signal from the distance measuring unit 32; a preestimating and calculating section 51; a comparing and calculating section 52 for comparing data received last in the preestimating and calculating section 51 with current or present data developed in the coordinates developing section 50 to take up the data judged as the same obstacle; a relative speed vector calculating section 53 for calculating the relative speed vector of the objective obstacles on the basis of the data judged as the same obstacle; first, second, third and fourth obstacle relative-position calculating sections 64, 65, 66 and 67; a switchover section 68, for selecting either one of outputs form the first and second obstacle relative-positions calculating sections 64 and 65, in accordance with the output signal from the vigilance degree detector 37, for supplying such selected outputs into the first judging means 62; and a switchover section 69 for selecting either one of outputs from the third and fourth obstacle relative-position calculating sections 66 and 67, in accordance with the output signal form the vigilance degree detector 37, for supplying such selected outputs into the second judging means 63.

In each of the first, second, third and fourth obstacle relative-position calculating sections 65, 64, 66 and 67, supposing that the braking is stared at a certain time, the relative position of the objective obstacle, after a lapse of a preset time from such braking start time, is calculated by multiplying the relative speed vector provided in the relative speed vector calculating section 53 by the preset time. More specifically, if the relative speed is represented by $\Delta V$ and the time of calculation required from the detection to the delivery is by $t_o$, and if the preset time is represented by $t_s$ and the preset deceleration of the subject vehicle by $\alpha_1$ and the preset deceleration of the objective obstacle is by $\alpha_2$, a relative distance $L_3$ between the subject vehicle and the objective obstacle, after the lapse of the preset time, is determined basically according to the following expression (4) in each of the first, second, third and fourth obstacle relative-position calculating sections 64, 65, 66 and 67.

$$L_3 = \Delta V \cdot t_s - 0.5 \cdot \{\alpha_1 \cdot (t_s - t_o)^2 - \alpha_2 \cdot t_s^2\} \quad (4)$$

Here, a first preset time $t_{s1}$ is set in the first obstacle relative-position calculating section 64, and a second preset time $t_{s2}$ is set in the second obstacle relative-position calculating section 65. A third preset time $t_{s3}$ is set in the third obstacle relative-position calculating section 66, and a fourth preset time $t_{s4}$ is set in the fourth obstacle relative-position calculating section 67. In each of the first, second, third and fourth obstacle relative-position calculating sections 64, 65, 66 and 67, the calculation according to the above expression is carried out by use of each of the preset times $t_{s1}$, $t_{s2}$, $t_{s3}$ and $t_{s4}$ independently set therein. This causes the relative position of the obstacle, after the lapse of each of the preset times $t_{s1}$, $t_{s2}$, $t_{s3}$ and $t_{s4}$, to be estimated.

The switchover section 68 is set to supply an output from the first obstacle relative-position calculating section 64 into the judging means 62, when the output from the vigilance degree detector 37 is of a low level, and to supply an output from the second obstacle relative-position calculating section 65 into the judging means 62, when the output from the vigilance degree detector 37, is of a high level. The switchover section 69 is set to supply an output from the third obstacle relative-position calculating section 66 into the judging means 63, when the output from the vigilance degree detector 37 is of the low level, and to supply an output from the fourth obstacle relative-position calculating section 67 into the judging means 63, when the output from the vigilance degree detector 37 is at high level.

The judging means 62 judges whether or not the relative position of the obstacle delivered from the first or second obstacle relative-position calculating section 64 or 65 is "0", and produces an operating signal, indicative of a command to operate the alarm $A_2$, when such relative position is "0". The judging means 63 judges whether or not the relative position of the obstacle delivered from the third or fourth obstacle relative-position calculating section 66 or 67 is "0", and produces an operating signal, indicative of a command to operate the electric-powered hydraulic pressure producing means $A_1$, when such relative position is "0".

With this second embodiment, the construction of the electronic control unit C' can be simplified, as compared with that in the first embodiment.

Although the embodiments of the present invention have been described in detail, it will be understood that the present invention is not intended to be limited to these embodiments, and various minor modifications in design can be made without departing from the spirit and scope of the invention defined in the claims.

For example, in place of each of the decelerations $\alpha_1$ and $\alpha_2$ used in the expressions (2), (3) and (4) as preset decelerations, and an actual deceleration of the subject vehicle and an actual deceleration of the obstacle can be used.

What is claimed is:

1. A collision judging system for a vehicle, comprising:

a subject vehicle position estimating means for estimating a position of a subject vehicle after a lapse of a preset time from a certain braking start time, on the assumption that a braking is started at said braking start time;

an obstacle position estimating means for estimating a position of an objective obstacle after a lapse of said preset time; and a judging means for judging whether or not the position of the subject vehicle after a lapse of said preset time estimated by the subject vehicle position estimating means and the position of the obstacle after a lapse of said preset time estimated by the obstacle position estimating means coincide with each other, wherein said subject vehicle position estimating means estimates the position of the subject vehicle after the lapse of said preset time according to the following expression:

$$\{V_1 \cdot t_o + V_1 \cdot (t_s - t_o) - 0.5 \cdot \alpha_1 \cdot (t_s - t_o)^2\}, \text{ and}$$

wherein said obstacle position estimating means estimates the position of the objective obstacle after the lapse of the preset time according to the following expression:

$$(V_2 \cdot t_s - 0.5\, \alpha_2 \cdot t_s^2),$$

wherein $V_1$ represents a travel speed of the subject vehicle; $V_2$ represents an absolute speed of the objective obstacle; $t_o$ represents a calculating time; $t_s$ represents the preset time; $\alpha_1$ represents a deceleration or preset deceleration of the subject vehicle; and $\alpha_2$ represents a deceleration or preset deceleration of the objective obstacle.

2. A collision judging system for a vehicle according to claim 1, wherein said subject vehicle position estimating means estimates the position of the subject vehicle after the lapse of the preset time by multiplying a vector of the subject vehicle based on travel speed and direction of the subject vehicle by the preset time, and said obstacle position estimating means estimates the position of the objective obstacle after the lapse of said preset time by finding a relative speed vector of the objective obstacle based on a change in relative position of the objective obstacle relative to the subject vehicle and by multiplying, by said preset time, an absolute speed vector of the objective obstacle obtained by adding the vector of the subject vehicle to said relative speed vector.

3. A collision judging system for a vehicle, comprising:

a relative-position estimating means for estimating a position of an object obstacle relative to a subject vehicle after a lapse of a preset time from a certain braking start time on the assumption that a braking is started at said braking start time; and a judging means for judging whether or not the relative position after a lapse of said preset time estimated by the relative-position estimating means coincides with a position of the subject vehicle, wherein said relative-position estimating means estimates the relative position of the obstacle position after the lapse of said preset time according the following expression:

$$\Delta V \cdot t_s - 0.5 \cdot \{\alpha_1 \cdot (t_s - t_o)^2 - \alpha_2 \cdot t_s^2\},$$

wherein $\Delta V$ represents the reactive speed of the objective obstacle with respect to the subject vehicle; $t_o$ represents a calculating time; $t_s$ represents the preset time; $\alpha_1$ represents a deceleration or preset deceleration of the subject vehicle; and $\alpha_2$ represents a deceleration or preset deceleration of the objective obstacle.

4. A collision judging system for a vehicle according to claim 3, wherein said relative-position estimating means estimates the relative position of the obstacle position after the lapse of the preset time by finding a relative speed vector based on a change in relative position of the objective obstacle with respect to the subject vehicle and by multiplying said relative speed vector by said preset time.

5. A collision judging system for a vehicle according to claim 1 or 3, wherein said preset time is set shorter than a time required for avoiding a collision of the subject vehicle against the objective obstacle by the driver's operation, and said judging means is connected to an actuator for operating a brake device.

* * * * *